US009654582B2

(12) United States Patent
Kelkar et al.

(10) Patent No.: US 9,654,582 B2
(45) Date of Patent: May 16, 2017

(54) ENHANCED SHARED MEMORY BASED COMMUNICATION DRIVER FOR IMPROVED PERFORMANCE AND SCALABILITY

(71) Applicants: Rasesh Kelkar, Pune (IN); Andrew Ushakov, Boston, MA (US); Jaikishan Dabhole, Pune (IN)

(72) Inventors: Rasesh Kelkar, Pune (IN); Andrew Ushakov, Boston, MA (US); Jaikishan Dabhole, Pune (IN)

(73) Assignee: SYBASE, INC., Dublin, CA (US)

( * ) Notice: Subject to any disclaimer, the term of this patent is extended or adjusted under 35 U.S.C. 154(b) by 173 days.

(21) Appl. No.: 14/145,187

(22) Filed: Dec. 31, 2013

(65) Prior Publication Data

US 2015/0189034 A1   Jul. 2, 2015

(51) Int. Cl.
 *H04L 29/08*  (2006.01)
 *H04L 29/06*  (2006.01)
(52) U.S. Cl.
 CPC .......... *H04L 67/2842* (2013.01); *H04L 67/42* (2013.01)
(58) Field of Classification Search
 CPC ....................................................... H04L 67/42
 USPC ....................................................... 709/203
 See application file for complete search history.

(56) References Cited

U.S. PATENT DOCUMENTS

| 6,502,213 | B1 | 12/2002 | Bowman-Amuah |
| 6,578,068 | B1 | 6/2003 | Bowman-Amuah |
| 7,472,233 | B2 | 12/2008 | McKenney et al. |
| 7,500,067 | B2 | 3/2009 | Rangarajan et al. |
| 7,562,138 | B2 | 7/2009 | Kilian |
| 7,689,660 | B2 | 3/2010 | Kilian et al. |
| 7,756,822 | B2 | 7/2010 | Danner et al. |
| 8,005,854 | B2 | 8/2011 | Chawla et al. |
| 8,156,082 | B2 | 4/2012 | Srivastava et al. |
| 8,312,228 | B2 | 11/2012 | Kessler |
| 8,438,535 | B2 | 5/2013 | Sun |
| 8,446,824 | B2 | 5/2013 | Li |
| 8,468,172 | B2 | 6/2013 | Block et al. |
| 2003/0014552 | A1* | 1/2003 | Vaitheeswaran ........ G06F 9/544 719/312 |
| 2006/0080514 | A1* | 4/2006 | Newport ................ G06F 9/544 711/153 |
| 2008/0162457 | A1* | 7/2008 | Dehn ...................... G06F 17/30 |

(Continued)

*Primary Examiner* — Hua Fan
*Assistant Examiner* — Sibte Bukhari
(74) *Attorney, Agent, or Firm* — Sterne, Kessler, Goldstein & Fox P.L.L.C.

(57) ABSTRACT

Enhanced shared memory based communication driver for improved performance and scalability is described. An example method includes creating a shared memory segment for a database server instance. The database server instance and a client reside on a same computing device. A first database connection is established to the database server instance using a pre-configured communication end point. An identifier of the shared memory segment for the database server instance is sent to the database server instance and the database server instance listens to subsequent connection requests generated on the shared memory segment. Moreover, a second database connection to the database server instance is established using the shared memory segment as a communication end point. Upon a successful connection of the second database connection, the first database connection is closed.

17 Claims, 8 Drawing Sheets

(56) References Cited

U.S. PATENT DOCUMENTS

2008/0282057 A1\* 11/2008 Layden ............... G06F 12/0223
 711/210
2011/0016160 A1 1/2011 Zhang et al.
2012/0174117 A1 7/2012 Jula et al.

\* cited by examiner

ENHANCED SHARED MEMORY BASED COMMUNICATION DRIVER FOR IMPROVED PERFORMANCE AND SCALABILITY

FIELD

The present disclosure relates generally to database systems, and in particular, to a communication driver in the database systems.

BACKGROUND

Generally, in a database system, a client and a server frequently communicate with each other using TCP/IP protocol. For example, a database server instance may host multiple coordinating processes or threads, which accept database client requests on a pre-configured TCP/IP port. Multiple coordinating processes or threads share the transactions to be carried out on behalf of a database client request and work interchangeably. In this context, the term database server instance corresponds to one or more database server processes. However, this configuration generates excessive overhead and contention in a two-tier deployment, where multiple clients and multiple database server instances reside on the same physical computing device.

Some conventional systems attempt to alleviate the TCP/IP contention by using separate TCP/IP ports for every database server instance and/or alleviate the TCP/IP overhead by implementing Inter Process Communication (IPC) mechanism (e.g., UNIX domain sockets) for communication with every database server instance. Nevertheless, such conventional systems do not scale up well and do not meet latency requirements laid down by widely published benchmarks. The problems are exacerbated in systems with a Non-Uniform Memory Access (NUMA) architecture, where the memory access time depends on the location of the shared memory segment relative to a processor. As a result, database clients as well as database server instances running on a NUMA node other than the one on which the single shared memory segment resides typically will frequently encounter higher memory access latencies.

Accordingly, conventional systems fail to provide a communication mechanism with ideal performance and scalability, especially when clients and database server instances are deployed on the same physical computing device.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for an enhanced shared memory based database communication driver with improved performance and scalability. As will be described in further detail below, embodiments can establish an initial connection between a client and a server (e.g., database server instance) in a two-tier deployment via a pre-configured communication end point, such as using TCP/IP port or using an IPC (Inter-Process Communication) mechanism (e.g., UNIX domain socket). A two-tier deployment hereinafter refers to a server and a client deployed on the same computing device. Embodiments can further implement a shared memory segment for each database server instance, once an identifier (ID) of the corresponding shared memory segment is sent successfully from the client to the corresponding database server instance via the pre-configured communication end point. Embodiments can eliminate contentions and reduce access latencies on a single memory segment shared among multiple database server instances running on different NUMA nodes. Embodiments can dynamically allocate separate shared memory segments for additional database server instances as additional database server instances start to support additional concurrent users. One embodiment dynamically allocates a shared memory segment for each additional database server instance. Accordingly, embodiments provide improved performance and scalability for communication between clients and database server instances when they reside on the same physical computing device.

Figure 1:
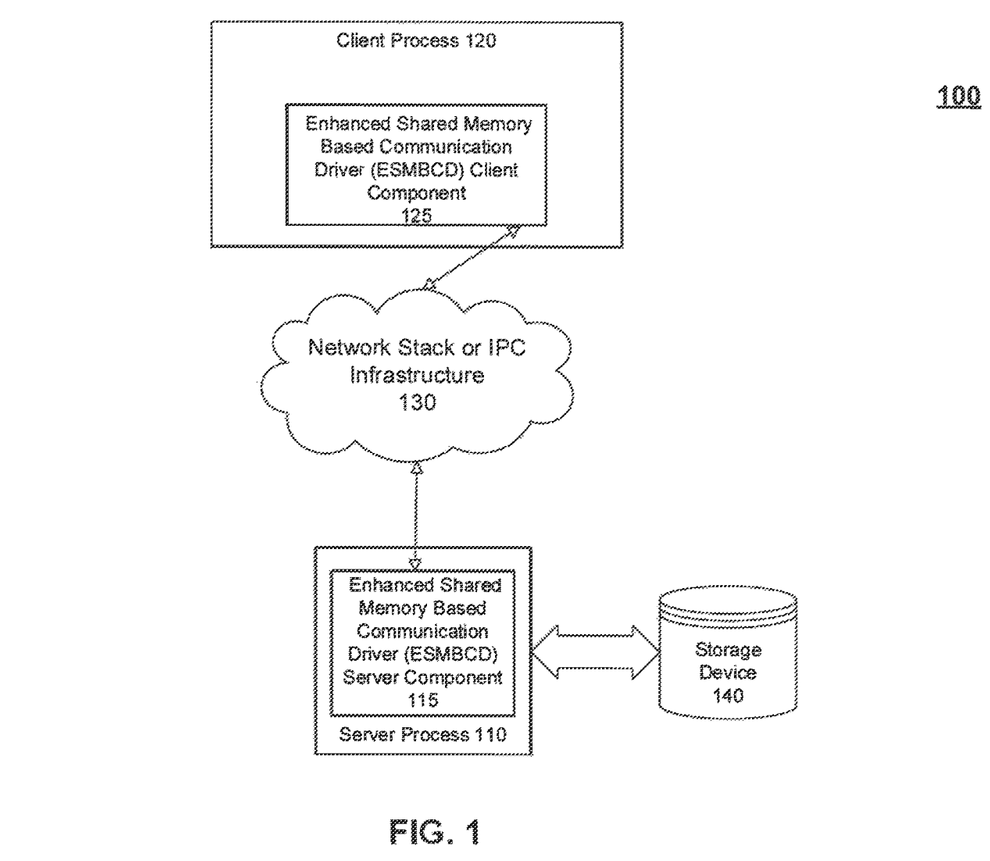
FIG. 1 illustrates a client/server system, according to an embodiment.

FIG. 1 illustrates a client/server system 100 confined to a single physical computing device, according to an embodiment. System 100 includes a database server instance that hosts one or more server process 110, a server component of Enhanced Shared Memory Based Communication Driver (ESMBCD) 115, a client process 120, a client component of Enhanced Shared Memory Based Communication Driver (ESMBCD) 125, a network stack or IPC infrastructure 130, and a common set of data residing in a storage device 140. Storage device 140, an example of which will be described in detail with respect to FIG. 8, can be any device for recording and storing information, which includes, but is not limited to, in-memory device, flash memory, hard disk, magnetic tape, and optical discs.

Client process 120 communicates with one or more server processes 110 using network stack or IPC infrastructure 130. Specifically, client process 120 may be connected to a Database Management System (DBMS) (not shown) hosted by a server process 110 via network stack or IPC infrastructure 130. The DBMS can operate as an independent process (i.e., independently of the client process 120), running under a server operating system such as, and not limited to, Microsoft® Windows (from Microsoft Corporation of Redmond, Wash.), HP-UX (HP), AIX (IBM), SUSE Linux (Novell), Solaris (Oracle), or Linux (Red Hat). The client/server system 100 includes functionality for packaging client calls in the form of a query language (e.g., Structured Query Language (SQL)) together with any parameter information into a format (of one or more packets) suitable for transmission to the DBMS server process. For example, client process 120 may send SQL statements to server process 110 and receive query results from server process 110. Client process 120 can include an application (e.g., an Enterprise Resource Planning (ERP) application, Customer Relationship Management (CRM) application, Product Lifecycle Management (PLM) application, Supply Chain Management (SCM) application, Supplier Relationship Management (SRM) application) that makes connections to server process 110 via network stack or IPC infrastructure 130.

Although only one server process 110 is shown, more server processes may be used as necessary. Client process 120 hosts an Enhanced Shared Memory Based Communication Driver (ESMBCD) client component 125. ESMBCD client component 125 may create an individual shared memory segment for each database server instance. An example of an ESMBCD client component 125 will be described in greater detail below with respect to FIG. 2. Although only one client process 120 is shown, more client processes may be used as necessary.

Server process 110 can host an ESMBCD server component 115. ESMBCD server component 115 may listen to client connection request on the shared memory segment. Client process 120 can send communication requests to server process 110 via the ESMBCD client component 125, which can in turn invoke the ESMBCD server component 115 for further processing. For example, client process 120 may generate requests to server process 110 for initial connection using TCP/IP as a communication end point. Client process 120 may generate subsequent requests to server process 110 using shared memory segment as communication end point.

The ESMBCD server component 115 and the ESMBCD client component 125 can be software, firmware, or hardware or any combination thereof in a computing device. As will be further described with respect to FIG. 8, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
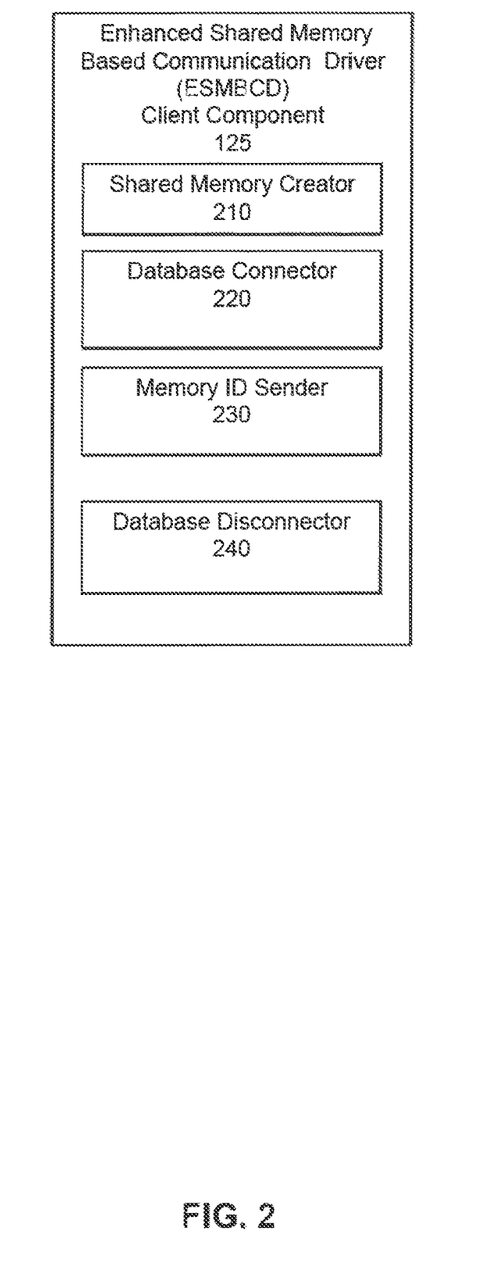
FIG. 2 illustrates elements of a client component of an Enhanced Shared Memory Based Communication Driver (ESMBCD), according to an embodiment.

FIG. 2 illustrates elements of an Enhanced Shared Memory Based Communication Driver (ESMBCD) client component 200, according to an embodiment. The ESMBCD client component 200 may correspond to the ESMBCD client component 125 in FIG. 1. The ESMBCD client component 200 can include a shared memory creator 210, a database connector 220, a memory ID sender 230, and a database disconnector 240. Note that in alternative implementations, the functionality of one or more of the shared memory creator 210, the database connector 220, the memory ID sender 230, and the database disconnector 240 are combined or divided.

The shared memory creator 210 creates a shared memory segment for a database server instance on a computing device. The database server instance (e.g., server process 110 in FIG. 1) and a client (e.g., client process 120 in FIG. 1) both reside on the same computing device. A database server instance can include, for example, and is not limited to an instance of a Relational Data Base Management System (RDBMS). According to an embodiment, a database server instance and a client are deployed on a same computing device to support two-tier client-server architecture.

For example, a database client (e.g., an application client, such as and not limited to an ERP client, SRM client, SCM client, CRM client) may include native command line or graphical user interface clients. Alternatively, a database client may include user-developed clients using industry standards such as, and not limited to, an Open Data Base Connectivity (ODBC) interface.

In an embodiment, a database server instance includes separate processes or threads. Database server processes may maintain information regarding users, client sessions, and transactions in memory using various data structures. The shared memory creator 210 creates an individual shared memory segment for each database server instance. Having a shared memory segment for each database server instance, which is shared between the database server instance and a corresponding database client on the same computing device, can eliminate the synchronizing of the database server instances in a multi-user environment.

Enterprise applications, such as, and not limited to an ERP application, CRM application, SRM application, SCM application, may support large, small, and midsize enterprises in various industries. For example, an application (e.g., ERP application) may use a centralized database server to support role-based access to critical data, applications, and analytical tools and helps streamline customer processes across functions, such as, procurement, manufacturing, service, sales, finance, human resources (HR), etc. An application (e.g., ERP application) may be organized into three-tiers. The first tier may be a user interface (UI) (e.g., graphical UI, command line UI). The second tier may include one or more application server instances. The one or more application server instances (e.g., ERP instances) can be client processes (e.g., client process 120 in FIG. 1) to a database server instance. The third tier may be a centralized database server. The centralized database server can include one or more database server instances that include one or more processes. A user interface may acts as a client to one or more application server instances, and the application server instances may act as clients to one or more database server instances.

Enterprises may deploy an application server (e.g., ERP application server) such that the three tiers are on separate physical computing devices. Alternatively Enterprises may deploy an application server and a database server in a two-tier deployment where the application server and the database server reside on the same physical computing device. In one embodiment, in a two-tier deployment an application server instance may communicate with a database server instance using an ODBC interface, which serves as a communication layer between the application server instance and a DBMS.

The database connector 220 establishes a first database connection to the database server instance using a pre-configured communication end point. Examples of using a pre-configured communication end point include, and are not limited to, using a TCP/IP port, using an Inter Process Communication (IPC) mechanisms (e.g., UNIX domain sockets) provided by an operating system.

A Non-Uniform Memory (NUMA) processor architecture is a computer memory design used in multiprocessing, where memory access time depends on the memory location relative to a processor. Under NUMA, a processor can access its own local memory (i.e. memory from its own NUMA node) faster than non-local memory (i.e. memory from NUMA node that is local to another processor).

NUMA provides separate memory for a set of processors, avoiding a performance hit when several processors attempt to address the same memory. The embodiments create an individual shared memory segment for each database server instance. Each shared memory segment can be allocated from the local memory of the NUMA node, and therefore scales better in NUMA based processor architectures. In an embodiment, an individual shared memory segment can be created for each database server instance for non-NUMA based processor architecture.

Once the database connector 220 establishes the first or an initial database connection to the database server instance using the pre-configured communication end point, the memory ID sender 230 sends an identifier (ID) of the shared memory segment to the corresponding database server instance. For example, the ID of the shared memory segment can be sent via a pre-configured communication end point using TCP/IP port or using an IPC mechanism (e.g., UNIX domain socket). Subsequently, the database server instance uses the ID of the shared memory segment to listen to communication requests generated on the shared memory segment. Examples of the ID of the shared memory segment can include, and are not limited to, a key that corresponds to the shared memory segment, a memory address of the shared memory segment, etc.

After communicating the memory ID of the shared memory segment from the client to the corresponding database server instance, the database connector 220 establishes a second or additional database connection to the corresponding database server instance using the shared memory segment as a communication end point. In one embodiment, once the second database connection is established, the client (e.g., client process 120 in FIG. 1), may send subsequent communication requests to the database server instance using the shared memory segment as the communication end point, and the database server instance may serve these communication requests from the database client using the shared memory segment. For example, the client and database server instance both have access to the same shared memory segment, allowing the server and client to change entries in the shared memory segment and thus read changes made by each other.

The database disconnector 240 closes the database connection that was established using the pre-configured communication end point (e.g., TCP/IP port) upon a successful connection of the database connection using the shared memory segment. In an embodiment, in the event that the connection using the shared memory segment is unsuccessful, a pre-configured communication end point may continue to be used. In an embodiment, the first database connection (e.g. a TCP/IP connection) is used by the memory ID sender 230 for sending an ID of the shared memory segment to the database server instance. Subsequent communications between the client and database server instance may be conducted using the shared memory segment as a communication end point. Accordingly, the first database connection may be closed after the shared memory segment-based database connection is established successfully.

Figure 3:
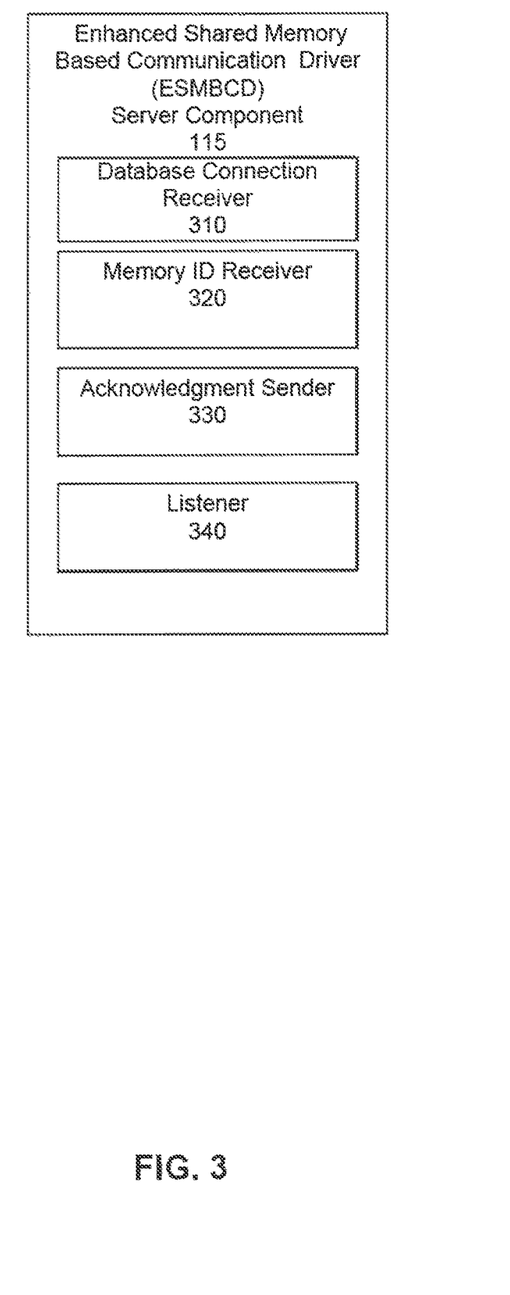
FIG. 3 illustrates elements of a server component of an ESMBCD, according to an embodiment.

FIG. 3 illustrates elements of an Enhanced Shared Memory Based Communication Driver (ESMBCD) server component 300, according to an embodiment. The ESMBCD server component 300 may correspond to the ESMBCD server component 115 in FIG. 1. The ESMBCD server component 300 can include a database connection receiver 310, a memory ID receiver 320, an acknowledgement sender 330, and a listener 340. Note that in alternative implementations, the functionality of one or more of the database connection receiver 310, the memory ID receiver 320, the acknowledgement sender 330, and the listener 340 are combined or divided. A database server instance (e.g., server process 110 in FIG. 1) can host an ESMBCD server component 300.

The database connection receiver 310 receives a database connection from a client using a pre-configured communication end point, where the client and a database server instance both reside on a same computing device. For example, the database connection receiver 310 may receive a connection request from the client via a TCP/IP port. Alternatively, the database connection receiver 310 may receive a connection request from the client using an IPC mechanism (e.g., UNIX domain socket) as a communication end point. A UNIX domain socket is a communications end point for exchanging data between processes executing within the same host that runs the UNIX operating system.

The memory ID receiver 320 receives an ID of a shared memory segment from the corresponding client. For example, the shared memory creator 210 on the corresponding client creates a shared memory segment for a database server instance on the same computing device where the database server instance resides. As noted above, the memory ID may be a key for the shared memory segment or a memory address of the shared memory segment.

The acknowledgement sender 330 sends an acknowledgement to the client based on successful receipt of the shared memory ID. The listener 340 listens to requests (e.g., connection requests, data requests), which are generated on the shared memory segment by the client process. For example, the client process and database server instance both have access to the same shared memory segment. The listener 340 may listen to requests (e.g., data requests) from the client and serve such requests using the shared memory segment. Further, database server instance and/or the client may change data that is stored in the shared memory segment and may read the changes made by each other from the shared memory segment.

The database connection receiver 310 receives an additional database connection from the client using the shared memory segment as a communication end point. In one embodiment, the initial database connection that is established using the pre-configured communication end point is terminated upon a successful connection of the database connection using the shared memory segment as a communication end point. In the cases where the connection using the shared memory segment is not successful, the database connection that is established using the pre-configured communication end point may continue to be used.

Embodiments of the elements of ESMBCD client component 200 in FIG. 2, and ESMBCD server component 300 in FIG. 3, as described herein, run in parallel for connections between different sets of client processes and database server instances. Such parallel execution of these elements can increase the efficiency and speed of system 100 in FIG. 1.

Figure 4:
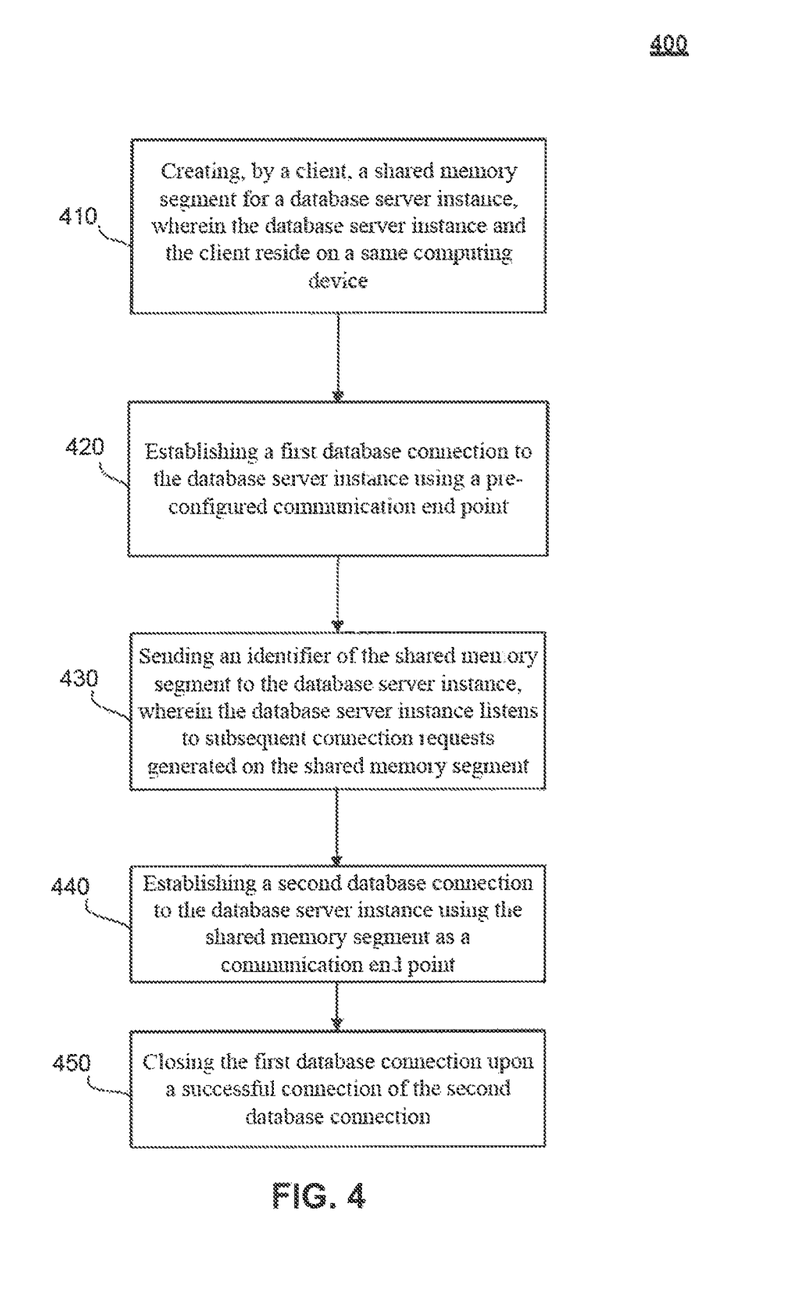
FIG. 4 is a flowchart for a method for database communications using an ESMBCD, according to an embodiment.

FIG. 4 is a flowchart for a method for database communications using individual shared memory segments for multiple database server instances, according to an embodiment. Method 400 can be performed by processing logic that can comprise hardware (e.g., circuitry, dedicated logic, programmable logic, microcode, etc.), software (e.g., instructions run on a processing device), or a combination thereof In one implementation, the method 400 is performed by an ESMBCD client component 125 of FIG. 1 and/or the ESMBCD client component 200 in FIG. 2, as described above. However, method 400 is not limited thereto.

At stage 410, the client component creates a shared memory segment for a database server instance. The database server instance and the client both reside on a same computing device. For example, the shared memory creator 210 creates a shared memory segment for a database server instance. Creating a shared memory segment is well understood in the art, which comprises reserving and allocating a segment of memory that is shared between the client and server processes.

Figure 6:
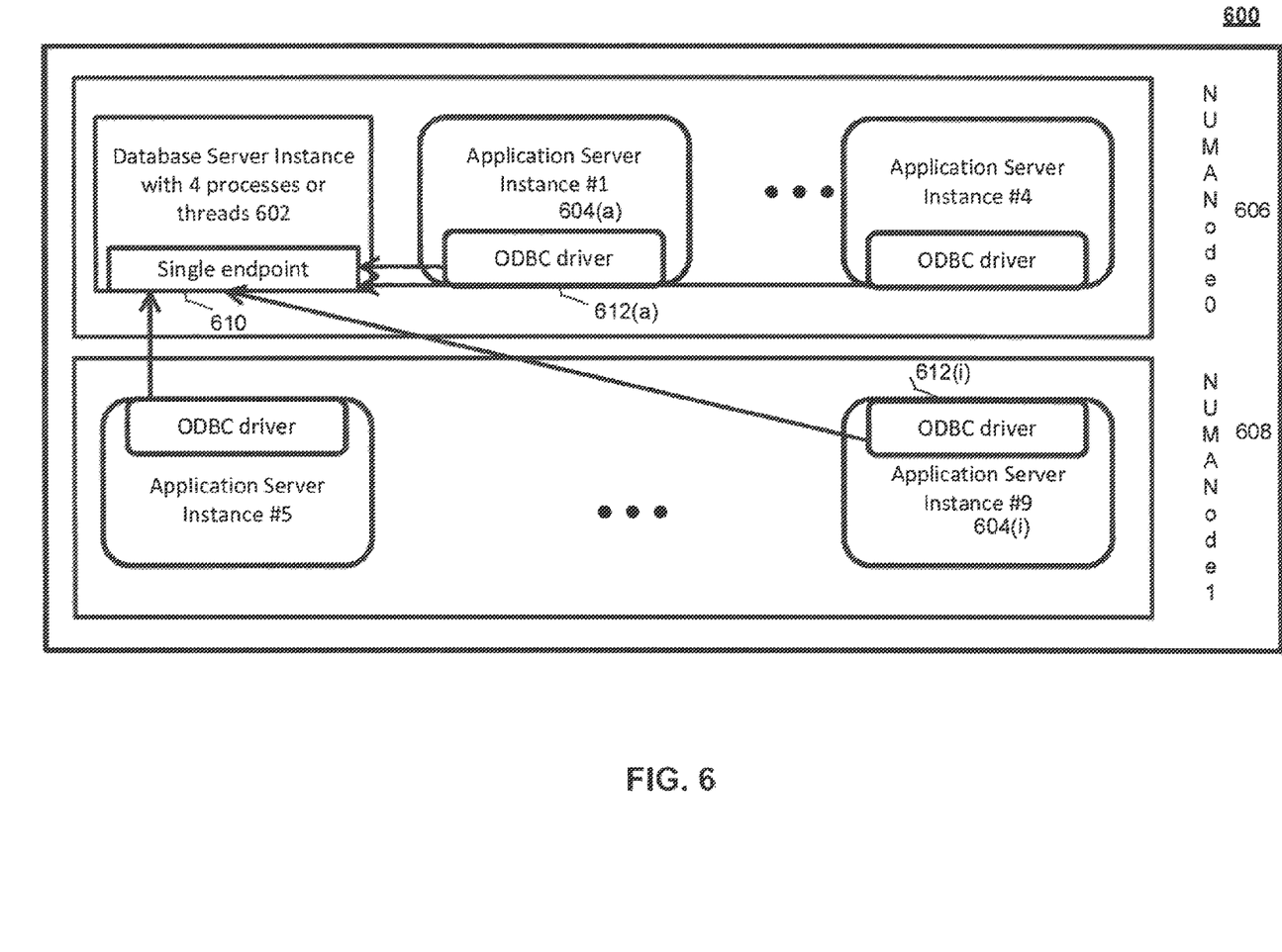
FIG. 6 depicts NUMA nodes with a single shared memory segment, according to an embodiment.

According to an embodiment, a database server instance uses multiple processes or threads that collectively handle all the transactions initiated by all the database clients (e.g., application server instances) on multiple NUMA nodes. FIG. 6 depicts NUMA nodes with a single shared memory segment, according to an embodiment. In the example illustrated in FIG. 6, database server, such as database server instance 602 and database clients, such as application server instances 1-9 604(*a*)-(*i*) reside on computing device 600. computing device 600 includes multiple NUMA nodes, such as NUMA node_0 606 and NUMA node_1 608. Application server instances 1-9 604(*a*)-(*i*) may span multiple NUMA nodes 606 to 608.

As illustrated in this example, database server instance 602 contains four processes or threads that handle requests from application server instances 1-9 604(*a*)-(*i*). A database server instance may serve request from an application server instance at a given time. In this example, a system may allocate a single shared memory segment 610 to handle requests for all database client instances 1-9 604(*a*)-(*i*), which contain shared memory communication end points required to communicate with database server instance 602 via ODBC driver 612(*a*)-(*i*).

Figure 7:
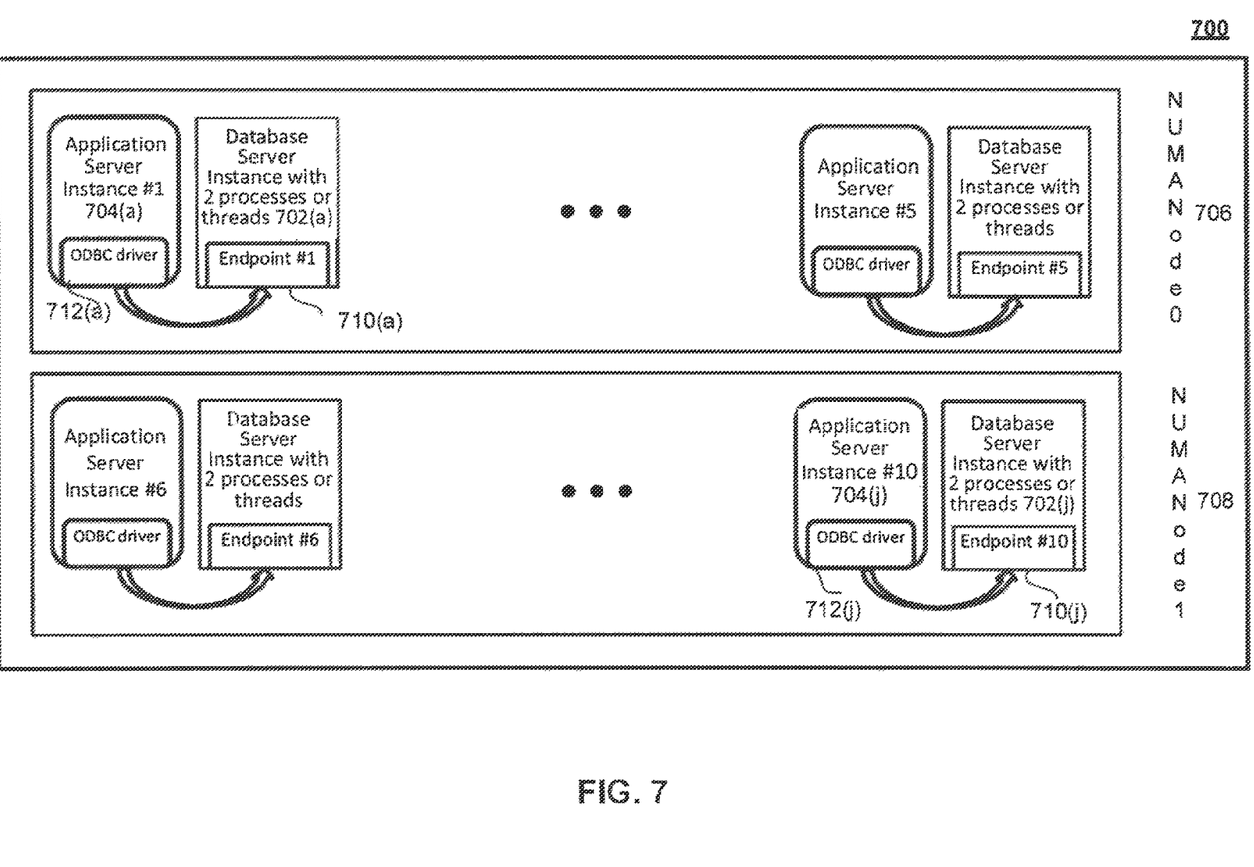
FIG. 7 depicts NUMA nodes with individual shared memory segments for multiple database server instances, according to an embodiment.

FIG. 7 depicts NUMA nodes with individual shared memory segments for multiple database server instances, according to an embodiment. In the example illustrated in FIG. 7, a database server is configured as multiple database server instances 702(*a*)-(*j*) on computing device 700. Multiple database clients, such as application server instances 1-10 704(*a*)-(*j*) reside on computing device 700. Computing device 700 includes multiple NUMA nodes, such as NUMA node_0 706 and NUMA node_1 708. The application server instances 1-10 704(*a*)-(*j*) may span the multiple NUMA nodes 706 to 708.

As illustrated in this example, each of database server instances 702(*a*)-(*j*) contains two server processes or threads. However, the database server instance is not limited to two processes or threads. This example is for illustration purpose, and not intended to be limiting, as a database server instance may contain multiple processes or threads. Both of these server processes may handle requests from one of the application server instances 1-10 704(*a*)-(*j*). In this embodiment, the individual shared memory segments 710(*a*)-(*j*) created on the local memory of the corresponding NUMA node may be allocated to each of the corresponding application server instances 1-10 704(*a*)-(*j*), which uses shared memory communication end points to communicate with respective database server instances 702(*a*)-(j) via ODBC driver 712(*a*)-(*j*), respectively.

In this embodiment, because each of the database server instances 702(*a*)-(*j*) have a separate shared memory segment for each of the application server instances 1-10 704(*a*)-(*j*), each application server instance may access the corresponding separate shared memory segment on the same NUMA node without incurring higher memory access latency. For example, the shared memory segment #1 710(*a*) and the shared memory segment #5 710(*e*) reside on NUMA node_0 706. Application server instance #1 704(*a*) may access the shared memory segment #1 710(*a*), while application server instance #5 is accessing the shared memory segment #5 710(*e*) without incurring higher memory access latency. Moreover, such configuration eliminates the need for synchronization among the database server instances 702(*a*)-(*j*) to access their respective shared memory communication end points. Accordingly, a configuration with separate shared memory segments for multiple database server instances provides improved performance and scalability. In still another embodiment, the separate shared memory segments are allocated for each additional database server instance dynamically as each additional database server instance starts.

The database server instances 702(*a*)-(*j*) can include pre-configured communication end points 714(*a*)-(*j*) for establishing initial communication with applications server instances 704(*a*)-(*j*). The pre-configured communication end points 714(*a*)-(*j*) can be, for example, TCP/IP ports or UNIX domain sockets.

Returning to FIG. 4, at stage 420, the client component establishes a database connection to the corresponding database server instance using a pre-configured communication end point. For example, the database connector 220 establishes a first database connection to the corresponding database server instance using a pre-configured communication end point (e.g., a TCP/IP port, a UNIX domain socket).

At stage 430, the client component sends an ID (e.g., key, address) of the corresponding shared memory segment to the respective database server instance. The database server instance can listen to communication requests generated on the shared memory segment. For example, the memory ID sender 230 sends the ID of the shared memory segment for each database server instance to the corresponding database server instance.

At stage 440, the client component establishes a database connection to the corresponding database server instance using the shared memory segment as a communication end point. For example, the database connector 220 establishes a database connection to the database server instance using the separate shared memory segment as a communication end point to communicate with each corresponding database server instance.

At stage 450, the client component closes the database connection, which was established using the pre-configured communication end point, upon a successful database connection using the shared memory segment as a communication end point. For example, the database disconnector 240 closes the database connection that was established using the TCP/IP port or IPC mechanism end point (e.g. UNIX domain socket), upon a successful database connection using the separate shared memory segment.

Figure 5:
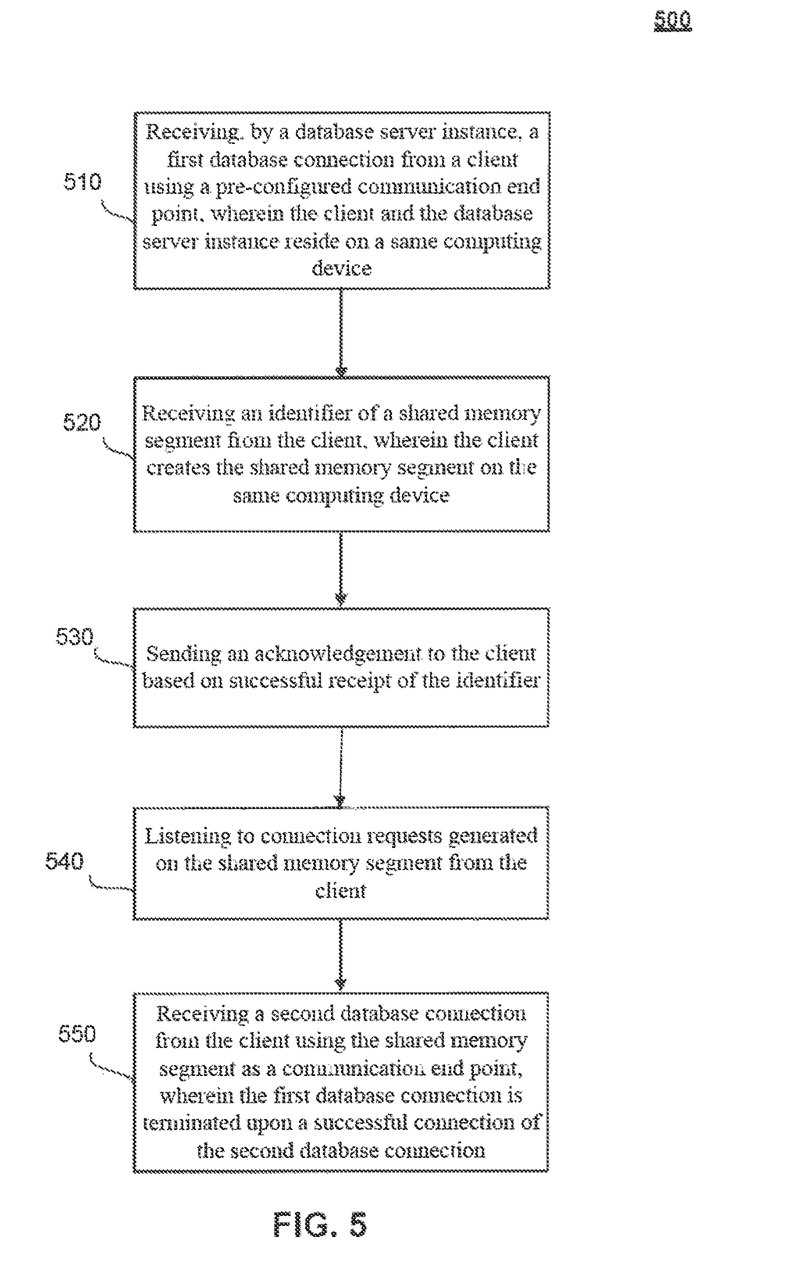
FIG. 5 is a flowchart for a method for database communications using an ESMBCD, according to an embodiment.

FIG. 5 is a flowchart for a method for database communications using separate shared memory segments for multiple database server instances, according to an embodiment. Method 500 can be performed by processing logic that can comprise hardware (e.g., circuitry, dedicated logic, programmable logic, microcode, etc.), software (e.g., instructions run on a processing device), or a combination thereof. In one implementation, the method 500 is performed by an ESMBCD server component 115 of FIG. 1 and/or the ESMBCD server component 300 in FIG. 3, as described above. However, method 500 is not intended to be limited thereto.

At stage 510, the server component receives a database connection from a client (e.g., application server instance) using a pre-configured communication end point, where the client and a database server instance both reside on a same computing device. For example, the database connection receiver 310 receives a database connection from a client using a pre-configured communication end point. The database connection receiver 310 may listen to requests (connection requests or data requests) on the pre-configured communication end point using protocols such as TCP/IP or IPC mechanisms (e.g., UNIX domain socket).

At stage 520, the server component receives an ID (e.g., key, address) of a shared memory segment from the client. The shared memory segment is created by the client on the same computing device. For example, the memory ID receiver 320 may receive the ID of the shared memory segment for the corresponding database server instance from the client.

At stage 530, the server component sends an acknowledgement to the corresponding client based on successful receipt of the shared memory ID. For example, the acknowledgement sender 330 sends an acknowledgement to the corresponding client based on successful receipt of the ID of the separate shared memory segment for the corresponding database server instance.

At stage 540, the server component listens to communication requests generated on the shared memory segment from the client. For example, the listener 340 listens to connection requests generated on the separate shared memory segment from the corresponding application server instance. In one embodiment, subsequent requests originated from the client are served using the shared memory segment as the communication end point.

At stage 550, the server component establishes a database connection from the client using the separate shared memory segment as a communication end point, and the first database connection is terminated upon a successful connection of the database connection using the separate shared memory segment as a communication end point. For example, the database connection receiver 310 establishes the database connection with the client using the separate shared memory segment as a communication end point.

In still other embodiments, the stages noted above may be further modified to make the shared memory communication end point creation process transparent to the end user and the shared memory based communication may be used discretely when both client and server reside on the same computing device.

In still other embodiments, given that a separate shared memory segment is only exposed to the specific database server instance, the embodiments provide better end point isolation, security and compliance. Furthermore, because the embodiments eliminate the need to pre-allocate any fixed number of shared memory segments for the database clients, each database client provisions for its communication end point as it starts. For example, embodiments can be extended further to dynamically spawn database server instances required to support more database clients as they are started.

In still other embodiments, the embodiments can be extended further to separate out individual database server instance specific data structures in their own shared memory segments. This can be extended further to dynamically spawn database server instances bound to specific NUMA nodes hosting separate shared memory segment containing database server instance specific data structures and communication end points. Embodiments shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
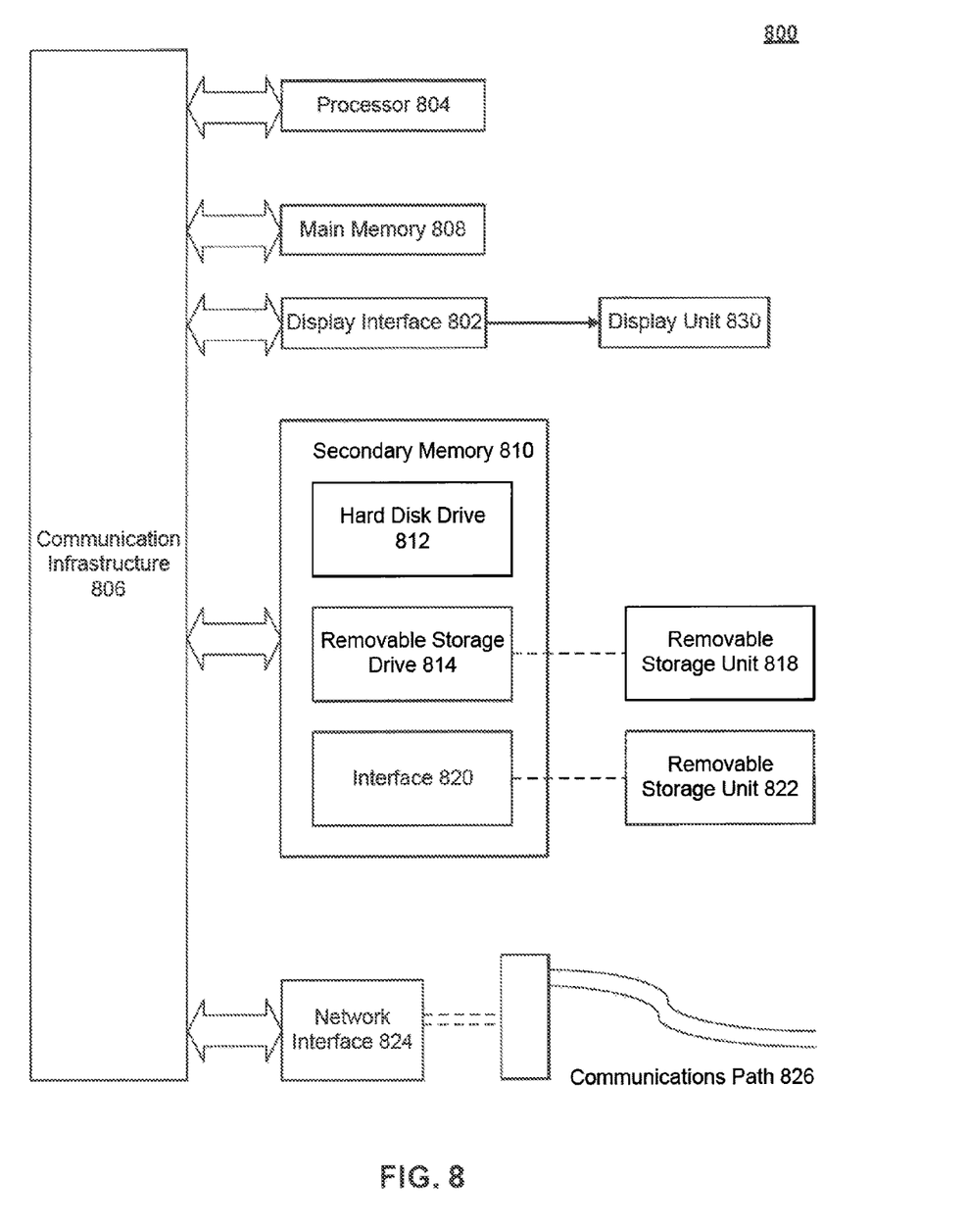
FIG. 8 is a diagram of an example computer system in which embodiments can be implemented.

FIG. 8 illustrates an example computer system 800 in which embodiments, or portions thereof, may be implemented as computer-readable code. For example, ESMBCD 115 and 125, including their components, as shown in FIGS. 2-3, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

Alternatively, embodiments can be implemented in Uniform Memory Access (UMA) architecture. Systems with UMA architecture are also referred as Symmetric Multi-Processor (SMP) systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 800. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well-known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a network interface 824. Network interface 824 allows software and data to be transferred between computer system 800 and external devices. Network interface 824 may include a modem, a network interface (such as an Ethernet card), a communications port, a PCMCIA slot and card, or the like. Software and data transferred via network interface 824 may be in the form of signals, which may be electronic, electromagnetic, optical, or other signals capable of being received by network interface 824. These signals may be provided to network interface 824 via a communications path 826. Communications path 826 carries signals and may be implemented using wire or cable, fiber optics, a phone line, a cellular phone link, an. RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via network interface 824. Such computer programs, when executed, enable computer system 800 to implement embodiments as discussed herein. In particular, the computer programs, when executed, enable processor device 804 to implement the processes of embodiments of the present invention, such as the stages in the methods illustrated by flowcharts 400 and 500 of FIGS. 4 and 5, discussed above. Accordingly, such computer programs represent controllers of the computer system 800. Where embodiments are implemented using software, the software may be stored in a computer program product and loaded into computer system 800 using removable storage drive 814, interface 820, and hard disk drive 812, or network interface 824.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:

creating, by a client, a shared memory segment for a database server instance, wherein the database server instance and the client reside on a same computing device, and wherein the creating further comprises allocating the shared memory segment within a local memory of a first NUMA (Non-Uniform Memory Access) node of a plurality of NUMA nodes residing on the computing device;

establishing a first database connection to the database server instance using a pre-configured communication end point;

sending an identifier of the shared memory segment to the database server instance, wherein the database server instance listens to subsequent connection requests generated on the shared memory segment;

establishing a second database connection to the database server instance using the shared memory segment; and closing the first database connection upon a successful connection of the second database connection;

allocating, within a local memory of a second NUMA node of the plurality of NUMA nodes residing on the computing device, an additional shared memory segment corresponding to an additional database server instance dynamically as the corresponding additional database server instance starts; and establishing a database connection between an additional client and the additional database server instance using the shared memory segment.

2. The method of claim 1, wherein the pre-configured communication endpoint comprises a TCP/IP port or a UNIX domain socket.

3. The method of claim 1, further comprising:

establishing communication from the client with the shared memory segment using an ODBC (Open Database Connectivity) driver.

4. The method of claim 1, wherein the client is an application server instance.

5. A method, comprising:

receiving, by a database server instance, a first database connection from a client using a pre-configured communication end point, wherein the client and the database server instance reside on a same computing device;

receiving, by the database server instance an identifier of a shared memory segment from the client, wherein the client creates the shared memory segment on the same computing device, and wherein the shared memory segment is allocated within a local memory of a first NUMA node of a plurality of NUMA nodes residing on the computing device;

sending an acknowledgement to the client based on successful receipt of the identifier;

listening to client connection requests generated on the shared memory segment;

receiving, by the database server instance, a second database connection from the client using the shared memory segment, wherein the first database connection is terminated upon a successful connection of the second database connection;

receiving, by an additional database server instance, an identifier of an additional shared memory segment from an additional client, wherein the additional shared memory segment is allocated within a local memory of a second NUMA node of the plurality of NUMA nodes residing on the computing device, and wherein the additional shared memory segment is allocated dynamically as the additional database server instance starts; and receiving, by the additional database server instance, a database connection from the additional client using the additional shared memory segment.

6. The method of claim 5, further comprising:

serving subsequent requests originated from the client using the shared memory segment as the communication end point.

7. The method of claim 5, wherein the identifier of the shared memory segment is a key corresponding to the shared memory segment or a memory address of the shared memory segment.

8. A system, comprising:

a memory; and at least one processor coupled to the memory and configured to:

create a shared memory segment for a database server instance, wherein the database server instance and a client reside on a same computing device, and wherein to create the shared memory segment the at least one processor is further configured to allocate the shared memory segment within a local memory of a first NUMA node of a plurality of NUMA nodes residing on the computing device;

establish a first database connection to the database server instance using a pre-configured communication end point;

send an identifier of the shared memory segment to the database server, wherein the database server instance listens to subsequent connection requests generated on the shared memory segment;

establish a second database connection to the database server instance using the shared memory segment;

close the first database connection upon a successful connection of the second database connection;

allocate, within a local memory of a second NUMA node of the plurality of NUMA nodes residing on the computing device, an additional shared memory segment corresponding to an additional database server instance dynamically as the corresponding additional database server instance starts; and establish a database connection to the additional database server instance using the additional shared memory segment.

9. The system of claim 8, wherein the pre-configured communication end point further comprises:

a communication end point using TCP/IP port or a communication end point using an IPC (Inter-Process Communication) mechanism such as a UNIX domain socket.

10. The system of claim 8, wherein the client communicates with the shared memory segment using an ODBC driver.

11. The system of claim 8, wherein the client is an application server instance.

12. A system, comprising:

a memory; and at least one processor coupled to the memory and configured to:

receive a first database connection from a client using a pre-configured communication end point, wherein the client and a database server instance reside on a same computing device;

receive an identifier of a shared memory segment from the client, wherein the client creates the shared memory segment on the same computing device, and wherein the shared memory segment is allocated within a local memory of a first NUMA node of a plurality of NUMA nodes residing on the computing device;

send an acknowledgement to the client based on the successful receipt of the identifier;

listen to subsequent connection requests generated on the shared memory segment from the client;

receive a second database connection from the client using the shared memory segment, wherein the first database connection is terminated upon a successful connection of the second database connection;

receive an identifier of an additional shared memory segment from an additional client for an additional database server instance, wherein the additional shared memory segment is allocated within a local memory of a second NUMA node of the plurality of NUMA nodes residing on the computing device, and wherein the shared memory segment is allocated dynamically as the database server instance starts; and receiving a database connection from the additional client using the additional shared memory segment.

13. The system of claim 12, the at least one processor further configured to:

serve subsequent requests originated from the client using the shared memory segment as the communication end point.

14. The system of claim 12, wherein the identifier of the shared memory segment is a key corresponding to the shared memory segment or a memory address of the shared memory segment.

15. A non-transitory computer readable storage medium having instructions encoded thereon, execution of which, by a processor, cause the processor to perform operations comprising:

creating, by a client, a shared memory segment for a database server instance, wherein the database server instance and the client reside on a same computing device, and wherein the creating further comprises allocating the shared memory segment within a local memory of a first NUMA (Non-Uniform Memory Access) node of a plurality of NUMA nodes residing on the computing device;

establishing a first database connection to the database server instance using a pre-configured communication end point;

sending an identifier of the shared memory segment to the database server, wherein the database server instance listens to connection requests generated on the shared memory segment;

establishing a second database connection to the database server instance using the shared memory segment; and closing the first database connection upon a successful connection of the second database connection;

allocating, within a local memory of a second NUMA node of the plurality of NUMA nodes residing on the computing device, an additional shared memory segment corresponding to an additional database server instance dynamically as the corresponding additional database server instance starts; and establishing a database connection between an additional client and the additional database server instance using the shared memory segment.

16. The method of claim 1, wherein the identifier of the shared memory segment is a key corresponding to the shared memory segment or a memory address of the shared memory segment.

17. The system of claim 8, wherein the identifier of the shared memory segment is a key corresponding to the shared memory segment or a memory address of the shared memory segment.

* * * * *